United States Patent [19]

Eisler et al.

[11] Patent Number: 6,078,942
[45] Date of Patent: *Jun. 20, 2000

[54] RESOURCE MANAGEMENT FOR MULTIMEDIA DEVICES IN A COMPUTER

[75] Inventors: Craig G. Eisler; G. Eric Engstrom, both of Kirkland, Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/637,483

[22] Filed: Apr. 25, 1996

[51] Int. Cl.$^7$ .................................................. G06F 9/00
[52] U.S. Cl. ............................................. 709/100
[58] Field of Search ...................... 395/670, 677, 395/834, 840; 712/228; 709/108, 107, 104, 101, 102

[56] References Cited

U.S. PATENT DOCUMENTS

| | | | |
|---|---|---|---|
| 4,604,694 | 8/1986 | Hough | 364/200 |
| 5,012,409 | 4/1991 | Fletcher et al. | 364/200 |
| 5,390,138 | 2/1995 | Milne et al. . | |
| 5,394,523 | 2/1995 | Harris . | |
| 5,455,599 | 10/1995 | Cabral et al. . | |
| 5,493,658 | 2/1996 | Chiang et al. | 345/336 |
| 5,671,442 | 9/1997 | Feeney et al. | 395/834 |
| 5,694,619 | 12/1997 | Konno | 395/888 |
| 5,699,535 | 12/1997 | Amro | 395/342 |
| 5,933,604 | 8/1999 | Inakoshi | 709/226 |

OTHER PUBLICATIONS

Opendoc Class Reference, Apple Computer, pp. 43–58, 260–287, 1995.

*Implementing Games for Windows Using the WinG API and the WaveMix DLL*, James Finnegan, Microsoft Systems Journal, pp. 61–81, Jan. 1995.

Primary Examiner—Majid A. Banankhah
Attorney, Agent, or Firm—Klarquist Sparkman Campbell Leigh & Whinston

[57] ABSTRACT

A resource management system in a multimedia application programming interface for a media device such as a display controller or a sound device. Applications in a multitasking environment can request exclusive access to the resources of a media device. When an application in exclusive mode gets the focus (has control over user input to the computer), all available resources of a media device are freed for its use. The system stores the state of the media device and automatically restores the state when an application in exclusive mode regains the focus. The multimedia API provides services so that an application can restore specific media resources.

16 Claims, 8 Drawing Sheets

RESOURCE MANAGEMENT FOR MULTIMEDIA DEVICES IN A COMPUTER

BACKGROUND OF THE INVENTION

When creating an application program for a computer such as a PC, the design of the user interface is a major concern to the application developer. In developing the user interface, the programmer typically has to include code to capture input from the user and provide output using the computer's peripherals. The interaction between an application and peripheral devices can vary significantly depending on the type of application and sophistication of the user interface. In a spreadsheet program, for example, the application needs to be informed when the user has updated a cell in a spreadsheet so that it can update the spreadsheet and display the proper result. Since the display changes rather infrequently and does not contain complex graphics in this example, the performance of the underlying software and hardware that controls the user interface is less critical. As such, the programmer can rely on a high level interface to graphics and input devices without being particularly concerned with the performance of the interface.

The user interfaces of many of today's multimedia applications, however, are significantly more complex and have rigorous performance requirements. In multimedia games for example, the interaction between the application and peripherals is critical to achieving a highly interactive and realistic user interface. The interaction between the application can include not only reading input from a joystick and displaying images, but can also include mixing audio files to generate sound effects, rendering three dimensional animation using a graphics accelerator, decompressing and playing video, and updating the display image fast enough to depict realistic scenes.

To control a peripheral devices in this manner, the application program can attempt to control the peripheral devices directly or can perform operations through a software interface. A software interface provides access to certain services through a specified set of operations which can be invoked to request the services. For instance, an interface to sound effect services might include operations to "prepare a sound for playing," "start playing a sound," and "wait until a sound has finished playing." In response to a request for a particular service, the interface attempts to provide the service by taking steps to control the underlying hardware. In effect, the interface does what the application would have to do if it were to try to control the hardware directly. In addition to communicating with the hardware, an interface sometimes provides some resource management so that programs running in the computer can share access to the limited hardware resources.

For the vast majority of applications, application programmers rely on some form of software interface to interact with the computer's peripherals. Programmers typically rely on software interfaces to the peripherals so that they can focus on the specifics of their application rather than on the specifics of controlling a particular device. Unfortunately, many of today's software interfaces cannot provide the level of performance that multimedia applications demand.

There are a number of software products on the market today that provide interfaces between application programs and peripheral devices. These interfaces are sometimes characterized as low or high level interfaces, and device independent or dependent. A high level interface is one whose operations request big-picture strategic services, such as "start playing this sound" or "display this document." A low level interface is one whose operations request tactical services specifically, such as "tell the sound card at I/O (input/output) address 220 to point its DMA buffer to memory address 1000000" or "tell the video card to copy the 64×64 pixel region from a location starting at address 0000001 to a location starting at 1000000 in video memory. In general a high level interface may be easier for a programmer to use, but a low level interface may provide better performance and functionality. Ease of use comes from having fewer details to take care of, while better performance comes from taking advantage of special cases the hardware handles well. Hiding details tends to disguise special cases as well.

The terms "device independent" and "device dependent" refer to the extent to which the interface is specific to a particular piece of hardware. Device independent interfaces provide operations that are not specific to a particular brand of hardware device. Instead, the operations hide the detail of the hardware from the application and take care of these details internally. In contrast, device dependent interfaces provide operations to control specific features of a particular piece of hardware. To write an application using a device dependent interface, the application developer has to have a detailed understanding of how the specific hardware operates.

Hardware dependence is usually not favored because it is not flexible to changes in the underlying hardware and can often lead to resource contention problems. Programs written for a device dependent interface can be rendered obsolete by updates to the underlying hardware, and commonly do not work for more than one brand of peripheral. In addition, device dependent interfaces are more susceptible to resource management problems because an application has access to its state information and can render it inoperable for other applications.

In general, high level interfaces tend to be device independent because they hide details, whereas low level interfaces tend to be device dependent because they reveal details. For instance, "play a sound" does not rely on the details of any sound card, but "tell the sound card at I/O address 220 . . . " obviously does.

While device independent, high level interfaces are generally easier to use for the reasons explained above, they typically are unable to provide the performance and functionality needed for certain types of applications. High level interfaces are often not sufficient for game applications and other multimedia applications because they are often incapable of achieving the desired performance. Games demand higher performance because they must achieve a high degree of user interactivity and visual realism. A game application typically has to collect rapidly changing user input, compute its impact on the current scene, and display the corresponding images and playback sounds with imperceptible delay.

Because they are designed for specific tasks, peripherals are usually much better at performing certain types of functions than the host processor. For example, a video card may have special purpose hardware that can copy pixels much faster than the CPU. A high level interface may not take advantage of this particular feature or may include additional layers of code that consume valuable CPU cycles and time before the operation is even started on the peripheral.

Since many peripherals have their own computing resources, such as processors and memory, performance can be improved by off-loading some tasks to the peripheral rather than consuming the resources of the host CPU.

However, without a low level interface to expose these resources to the application, they are not fully exploited.

Resource management is an important aspect of software interfaces for multimedia devices. In this context, resource management refers to how the system software or software interfaces in the computer control allocation of the multimedia hardware among applications that wish to use those resources. For example, resource management enables applications to share access to a display device or a sound device for example. In a multitasking environment, a number of applications may wish to control a portion of the display or control the audio output, for example.

One way to allocate resources is simply to give the resources on a first come, first serve or "cooperative" basis. This is not an adequate solution for applications which require more extensive use of a particular resource. For example, a game application may need to have complete control of both the display device and sound card in the computer to operate effectively.

One solution often used to support these types of applications is to give them complete control over the entire system. In this circumstance, there is no multitasking capability at all. Obviously, this is not an acceptable alternative because the user can not easily change focus from one application to the next.

SUMMARY OF THE INVENTION

The invention provides an improved method for managing multimedia resources in a multitasking environment. This method is implemented in multimedia device interfaces for media devices such as a display controller or sound device. It can be used for variety of media devices as well.

One aspect of the invention is a resource manager for multimedia devices in a multitasking computer system. The resource manager supports an exclusive mode that enables an application to exclusively control available resources for a particular media device such as the display controller (video card) or sound device. An application in exclusive mode maintains exclusive control as long as it has the focus. When the application loses focus (i.e. moves to the background), the resource manager keeps track of the resources that the application controlled and the state of the media device when it had the focus. This enables the application to reclaim its resources when it regains the focus.

Another aspect of the invention is the multimedia APIs that support exclusive mode in a multitasking environment. One implementation of the multimedia API includes an API function to set the mode for resource management purposes. There are at least two modes or "levels of cooperation" including exclusive mode. In exclusive mode, resources are allocated, freed, and restored as explained above. In cooperative mode, multimedia resources are allocated on a first come first serve basis.

Further advantages and features of the invention will become apparent with reference to the following detailed description and accompanying drawings.

DETAILED DESCRIPTION

The invention relates to resource management for multimedia devices in a computer. Specifically, it relates to a method for controlling resource allocation when an application or other user requests exclusive access to a multimedia resource such as a display controller or sound device in a multitasking computer system. Below, we begin by describing a computer system in which the resource manager can be implemented. We then proceed to describe implementations of the resource manager and methods for resource management in more detail.

Figure 1:
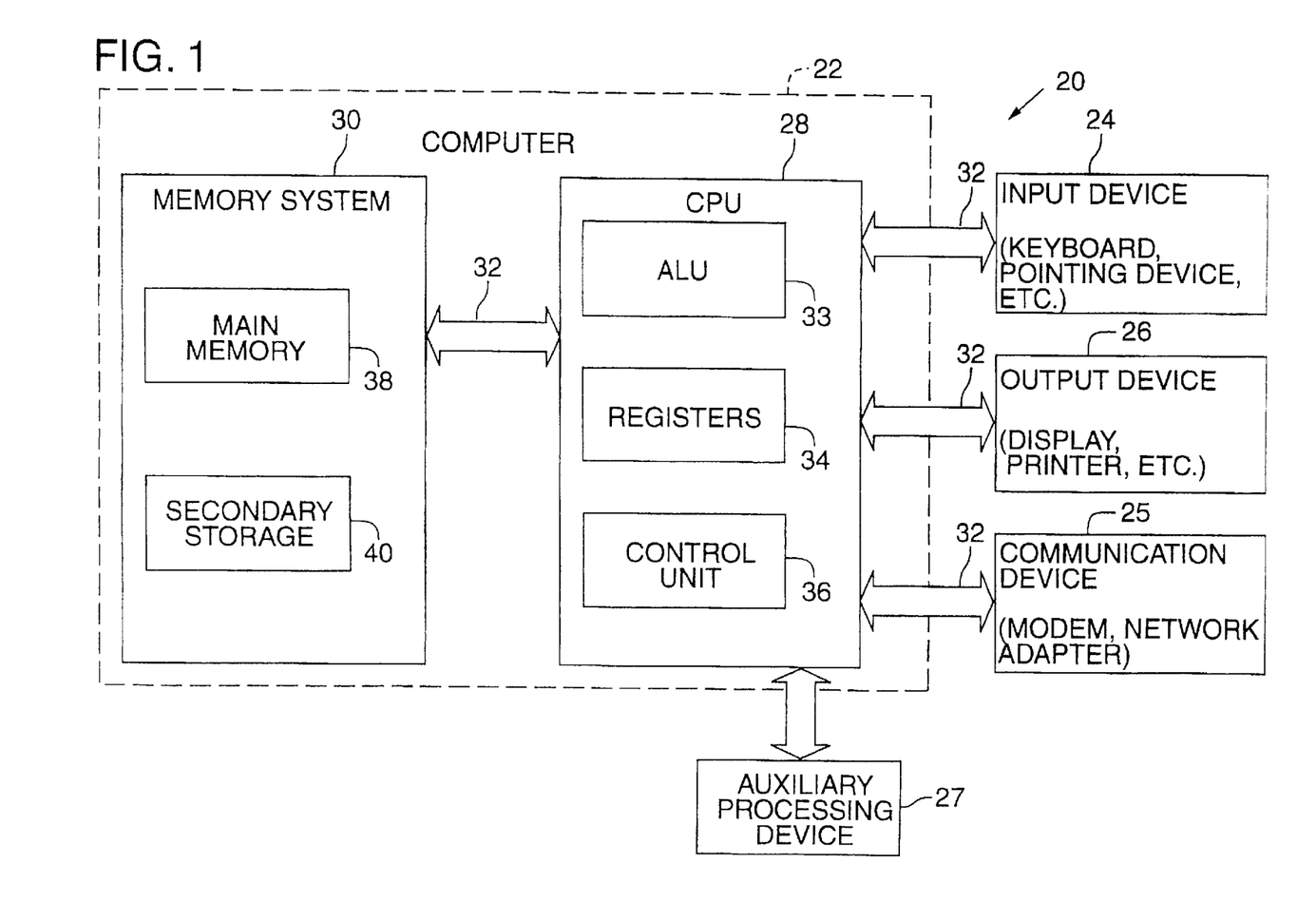
FIG. 1 is a general block diagram of a computer system in which an embodiment of the invention can be implemented.

FIG. 1 is a general block diagram of a computer system 20 in which an embodiment of the invention can be implemented. The computer system 20 includes as its basic elements a computer 22, one or more input devices 24 and one or more output device 26. The computer system can also include a communication device 25 and an auxiliary processing device 27.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. or other devices that use optical, magnetic or other recording material. Main memory 38 stores programs such as a computer's operating system and currently running application programs. In some implementations, portions of main memory 38 may also be used for displaying images through a display device.

Input device 24 and output device 26 are typically peripheral devices connected by bus structure 32 to computer 22. Input device 24 may be a keyboard, pointing device, pen, joystick, head tracking device or other device for providing input data to the computer.

Output device 26 may be a display device, printer, sound device or other device for providing output data from the computer.

The communication device 25 can include any of a variety of peripheral devices that enable computers to communicate. For example, the communication device can include a modem or a network adapter.

The auxiliary processing device 27 refers generally to a peripheral with a processor for enhancing the performance of the computer. One example of an auxiliary processing device is a graphics accelerator card.

FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

The invention is preferably implemented in a multitasking environment. One implementation described below is implemented in the Windows® 95 Operating System. However, the invention can be implemented in computers or other microprocessor based platforms that have a multitasking capability. Other multitasking environments include the operating system of the Apple MacIntosh family of computers from Apple Computer, the OS/2 Operating System from IBM Corporation.

Figure 2:
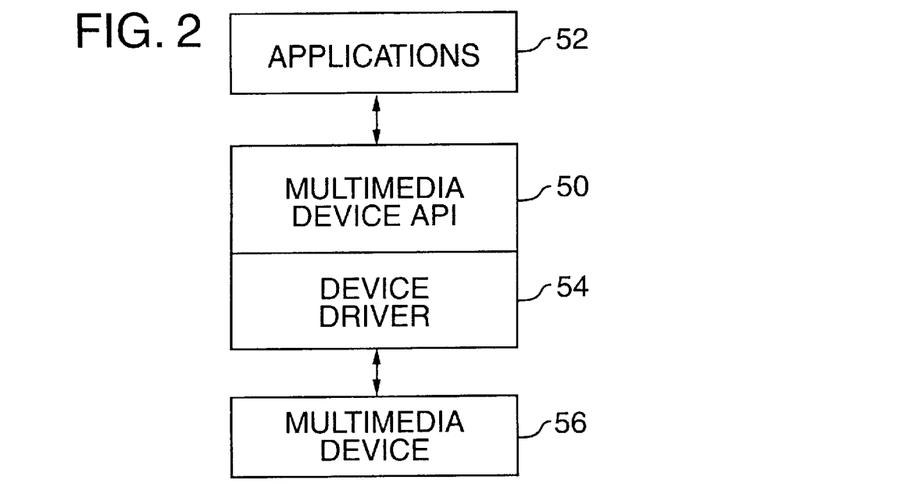
FIG. 2 is a block diagram of a multimedia architecture of an embodiment of the invention.

FIG. 2 is a block diagram illustrating the architecture of multimedia device interfaces 50 in which an embodiment of the invention is implemented. This diagram illustrates relationships between application programs ("applications") 52, multimedia device application programming interfaces (API) 50, device driver 54 and multimedia device hardware 56.

The multimedia API 50 provides a device independent interface to a media device such as a display controller, sound device, 3D accelerator, input device, etc. The API 50 is typically implemented as a dynamic linked library (DLL). The API services access a media device via the device driver 54. The device driver is a device specific interface to the media device.

The media device can be a discrete device for a particular type of media such as a video card or sound card, an integrated media device, or a group of media devices.

To access a multimedia device, the applications invoke functions in the multimedia API. In response to these API requests, the API accesses the multimedia device through the device driver 54. Since the focus of the invention is on resource management, the specific types of functions in the multimedia API are not relevant, except to the extent that they relate to resource management. In general, the functions in the API enable applications to control and access functionality of a particular media device or devices. We provide more specific examples in the context of a specific implementation below.

The multimedia API includes a resource manager that enable applications to get exclusive access to a media device. The resource manager in the API can grant exclusive access to applications in a multitasking environment that request exclusive use of the media device. If given exclusive access, an application gets exclusive control of the media device when it gets the focus in the multitasking environment. For example, when implemented in a display device API, an application can use this feature to get exclusive access to the display controller and the video memory and color table used to render and display images on a display monitor. Similarly, when implemented in a sound device API, the application can use this feature to get exclusive access to a sound card and the primary sound buffers used to generate the audio output of the computer.

This exclusive access is particularly useful for multimedia applications where an application can get exclusive access to the media hardware to achieve better performance. With exclusive access to a video card, an application can use as much of the video memory as it needs without conflict with another application. In addition, the application can perform screen flipping using the screen flipping support in the display controller to flip between two full screens of image data. Exclusive control of the display controller is especially useful to support screen flipping because it allows one application to use the screen flip hardware without conflicting with other application's use of the display and because it frees up additional video memory to support rendering and flipping of full screen images. Similarly, with exclusive access to a sound card, the application can use all of the resources of the sound card without conflict from another application. The application with exclusive access to the sound card is the only application that is audible.

In addition to display device and audio APIs, the resource management functions used to control exclusive access to a media device apply to other media devices as well.

The resource manager in the API controls the allocating, freeing, and restoring of media resources. The resource manager allocates all resources of a particular device to an application when it is in exclusive mode. The application gets exclusive access to the media device when it has the focus and retains it as long as it has the focus. Having the "focus" in the context of a multitasking environment means that the application is currently receiving any user input. In a windowing environment, for example, the application running in a window that the user is currently interacting with has the focus.

When the application loses the focus, the resource manager frees the application's resources but stores information about the state of the system so that these resources can be restored when it regains the focus. The resource manager keeps track of the resources controlled by the application at the time it loses the focus. It also stores that state of the media device when the application had control of it.

When the application regains the focus, the resources it had when it lost the focus can be reclaimed. The resource manager restores the state of the media device that it controlled when it had the focus. In addition, the application can restore resources that it had controlled at the time it lost the focus by invoking a Restore function in the API. In response to a Restore request for a specific resource, the resource manager re-allocates the specified resource.

When an application attempts to access resources that have been freed or "lost," the API returns an error. When another application has the focus in exclusive mode, the application cannot restore the resource until the application regains the focus.

In one specific implementation, APIs for the media devices in the computer system are implemented using an object oriented approach. Each of the multimedia APIs include a function to create an instance of a device object representing the underlying media hardware. For example, the display device interface includes a function to create an instance of a display device object, the sound device API includes a function to create an instance of a sound device object, the 3D API includes a function to create an instance of a 3D device object, etc.

In this particular implementation, the media device objects are implemented as a COM interface. The member functions of the object types include the standard member function of a COM interface in addition to the specific functions described below. The design and function of a COM interface is well understood in the field and is described in several publicly available documents including "Inside OLE" by Kraig Brockschmidt, MS Press. While the following implementation is implemented using COM interfaces, other programming approaches can be used to implement the invention as well.

Figure 3:
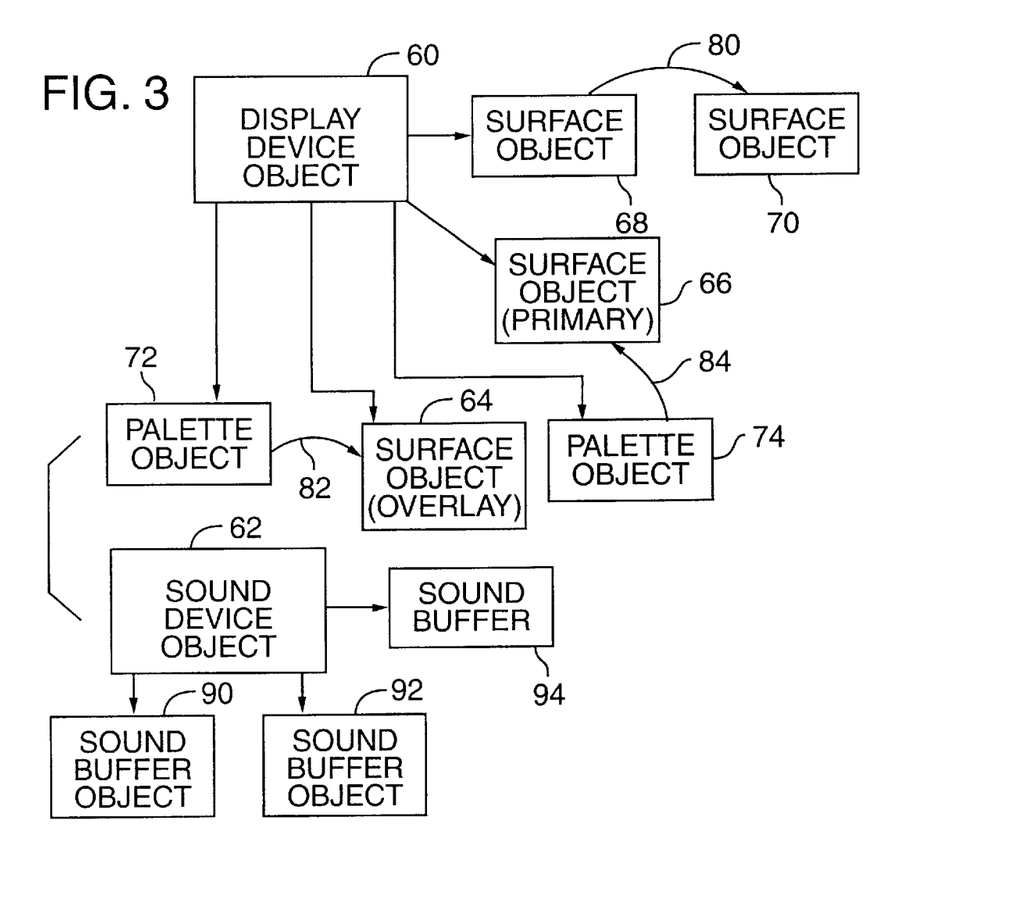
FIG. 3 is a block diagram illustrating the multimedia API architecture in one embodiment.

The device object in this particular architecture owns the global attributes and capabilities for the device that it represents. FIG. 3 illustrates examples of different media device objects 60, 62 representing media devices in a computer. The display device object 60 owns global attributes of the display device (e.g. video card) that it represents including, for example, the display mode, video memory, overlay capabilities, available palette capabilities and pixel formats, etc. The display device object 60, in this implementation, also controls default values for the global attributes such as the color key values, color depth, resolution and the hardware's display mode.

The sound device object 62 controls the global attributes and capabilities of the sound device that it represents including the master volume, sample rate capabilities, sound mixing capabilities, available device memory, etc.

The media device objects include member functions to enable applications to request exclusive control of the corresponding media device. For example, the display device object includes a member function used by applications to request normal or exclusive access to the display device that it represents. The sound device object includes a member function used by applications to request exclusive access to the sound device that it represents.

Applications get access to resources of a particular media device by invoking member functions of the media object to create objects representing the hardware resource. Each of the media device objects include member functions to create objects that provide access to and control of the respective media hardware. The media device objects create instances of objects in the context of the hardware that they represent. Thus, when invoking these functions to create instances of these objects, an application can only create instances of objects compatible with the capabilities of the media object's.

The display device object includes member functions to create surface 64–70 and palette objects 72, 74. The relationship between palette and surface objects and the display device object that corresponds to them is illustrated in FIG. 3 by the arrows from the display device object 60 to the palette object 72 and the surface objects 64–70.

A surface object represents a region in memory that holds a pixmap, an alpha buffer, or a Z buffer, for example. The primary surface is the pixel memory used by the display device to generate the pixel image. To control a piece of surface memory, the application invokes the CreateSurface member function of the surface object and specifies the attributes of the surface that it wants access to. These attributes include the type of surface such as primary surface, an overlay, an alpha buffer, a z buffer, etc., the pixel format, and the height and width of the surface. The CreateSurface member then allocates the surface object and gives the application a pointer to the surface object representing the resource.

The member functions of the surface object provides services for managing and manipulating surfaces. These services include functions to flip surfaces, attach or detach a surface from another surface, perform a bit block transfer, list surfaces attached to a given surface, attach or return a palette object attached to a surface, return a clipper object attached to the surface, etc. The function for attaching a surface to another surface is used to associate one surface with a related surface. For example, one may want to attach an alpha or z buffer to a surface storing a pixmap. To do so, the application would invoke the member function to attach a surface object representing an alpha buffer to the surface object representing the pixmap. FIG. 3 illustrates this concept by showing the attachment link 80 between two surface objects 68, 70. This CreateSurface member creates this attachment link to form a flipping structure, which includes a front buffer and one or more attached back buffers.

A surface object includes a Restore member function used to restore a surface that has been "lost." A surface is "lost" if the surface memory associated with the surface object has been freed. Surfaces can be lost because the mode of the display controller was changed or because an application received exclusive access to the display controller and freed all of the surface memory currently allocated on the display controller. An implementation of this function is described further below.

When a surface object loses its surface memory, many members will return SURFACELOST and perform no other function. The Restore member function reallocates surface memory and associates it with the surface object. Note that the actual data is not restored, only the underlying surface memory.

An application associates a color palette with a surface by attaching a palette object, representing a palette, to the surface object, representing a surface. This is illustrated in FIG. 3 by the attachment links 82, 84. A palette object is an object that represents a color table. The palette object includes member functions to get and set entries in a palette. It also includes a function to return the capabilities of specified instance of a palette object. To create a palette object, an application invokes a CreatePalette member function of the display device object and specifies the type of palette to be created. If the display device object supports this type of palette, it creates an instance of a palette object. An application controls the color specification of the primary surface by creating a palette object 74 and attaching this palette object 74 to the surface object 66 representing the primary surface as shown in FIG. 3.

The sound device object 62 includes a member function to create a sound buffer object (90–94, for example). The sound buffer object represents a region in memory for storing a sound or sequence of audio samples. The primary sound buffer represents the actual audio samples output to the sound device. These samples can be a single audio stream or the result of mixing several audio streams. The audio data in a primary sound buffer is typically not accessed directly by applications; however, the primary buffer can be used for control purposes, such as setting the output volume or wave format. Each secondary sound buffer represents a single output stream or sound. An application can invoke member functions of the sound buffer object to play these buffers into the primary sound buffer. Secondary sound buffers that play concurrently are mixed into the primary buffer, which is then sent to the sound device.

The sound object includes a number of member functions to control playback (play, stop, get current play position, lock or unlock a sound buffer, etc.), manage the sound environment (get and set frequency and volume), and get information about a sound buffer (return its capabilities, return the format of the sound data, etc.).

To create an instance of a sound buffer, the application invokes a "CreateBuffer" member function of the sound device object and specifies the attributes of the sound buffer to be created as well as the sound device object associated with it. If the sound device object supports the attributes of the requested sound buffer, it creates an instance of a sound buffer object. The application can control the sound buffer by invoking member functions of the sound buffer object and specifying the sound buffer object to be accessed.

Like the display device object, the sound device object creates sound buffers in the context of the sound device that it represents. Sound buffer objects 90, 92, 94 can have specific attributes and capabilities based on the attributes and capabilities of its sound device object. The sound buffer has attributes such as volume, a specific location in memory, and a sample rate, all provided in the context of the sound device object.

Having described the object architecture, we now describe how applications control access to resources with specific examples of the SetCooperativeLevel function of the display device and sound device objects.

Access to the Display Device

To request exclusive access to the display device, an application calls the SetCooperativeLevel member of the display device object representing the display device. The application specifies the display device object, a window handle used by the application and a flag representing the level of access. The reference to a window handle refers to a feature in the Windows family of operating systems from Microsoft Corporation. Well known to those in the field, a window handle is used to reference a window and to control the behavior of a window. An application having a window handle can receive messages about the state of the window and about user inputs to the window.

In this implementation, the application can specify normal or exclusive access. In normal mode, the application functions as typical Windows application; resources are allocated on a first come, first serve basis. If the application sets the FULLSCREEN and EXCLUSIVE flags in this call, it becomes responsible for the entire primary surface.

Access to the Sound Device

One implementation of the sound device object includes a SetCooperativeLevel member function. Applications call this function to set the level of access to the resources of the sound device. To invoke this member, an application specifies the sound device object, its window handle and a flag representing the requested level of access.

The flags in this particular implementation, are set forth below:

DSSCL$_{13}$ EXCLUSIVE

Sets this application to exclusive level. When this application has the input focus, it will be the only application audible. This application also has all the privileges of the DSSCL_PRIORITY level described below. The sound device API restores the hardware format (as specified by the most recent call to the SetFormat member function of the sound buffer object) when the application gets the input focus.

DSSCL_NORMAL

Sets the application to fully cooperative status. Most applications should use this level, as it is guaranteed to have the smoothest multitasking and resource-sharing behavior.

DSSCL_PRIORITY

Sets this application to priority level. Applications with this cooperative level can call the SetFormat member of the soundbuffer object to set the format of the primary buffer and the Compact member function sound device object to move unused sound memory on board the sound device (if available) to a contiguous block to maximize the amount of free memory.

DSSCL_WRITEPRIMARY

The highest priority level. The application has write access to the primary buffers. No secondary buffers (in this application or other applications) can be played.

In this implementation of the sound device API, an application must set the cooperative level by calling this member function before its buffers can be played.

As set forth above there are four cooperative levels: normal, priority, exclusive, and write-primary.

The normal cooperative level is the lowest level.

When using a sound device object with the priority cooperative level, the application has first priority to hardware resources (such as hardware mixing), and can call the SetFormat and Compact functions.

When using a sound device object with the exclusive cooperative level, the application has all the privileges of the priority level and, in addition, only that application's buffers are audible when the application has the input focus. When the application gains the input focus, the sound device API restores the application's preferred wave format (defined in the most recent call to the SetFormat member function).

When using a sound device object with the write-primary cooperative level, the application has direct access to the primary sound buffer.

When an application with the write-primary cooperative level gains the input focus, all secondary buffers for other applications are stopped, marked as lost, and must be restored using the Restore member function before they can be played.

When an application with the write-primary cooperative level loses the input focus, its primary buffer is marked as lost, and can be restored after the application regains the input focus.

The process of managing resources in exclusive mode generally includes three primary phases: allocating resources of a media device, freeing the resources of the media device, and restoring resources. Below we describe methods for these aspects of resource management in more detail.

Figure 4:
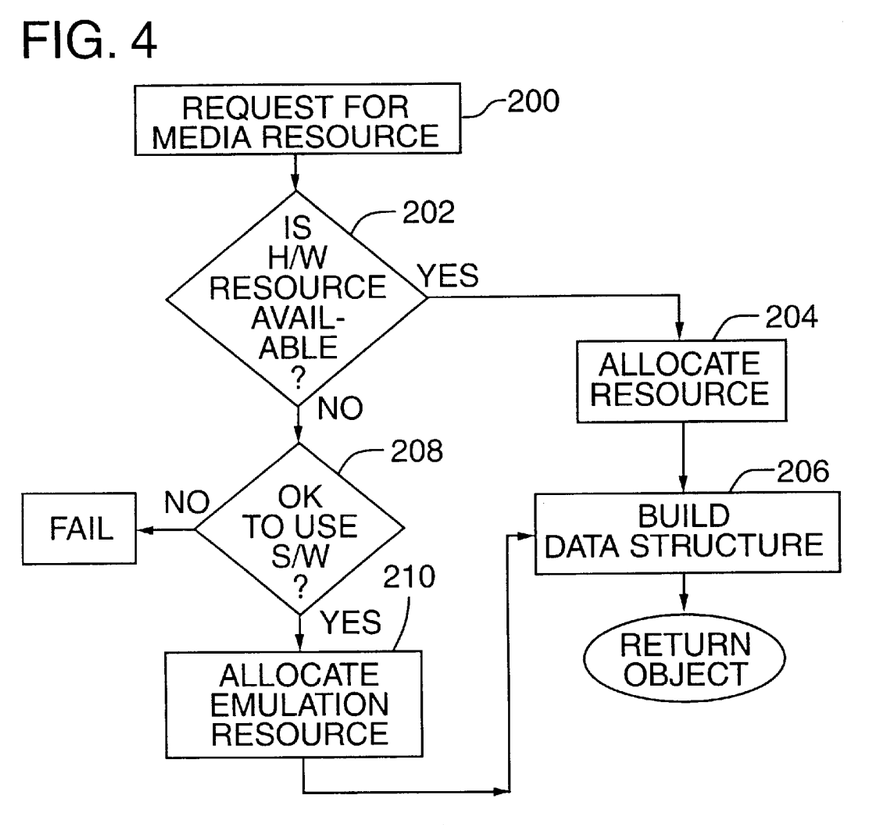
FIG. 4 is a flow diagram illustrating a method for allocating media device resources in an embodiment of the invention.

FIG. 4 is a flow diagram illustrating a method for resource management. The resource manager allocates a resource when an application makes a request for the resource of a particular media device (200). In the implementation described above, an application invokes the Create object member function of the device object representing a media device.

In response, the resource manager determines whether the hardware resource is available (202). For example for a surface object, it checks whether there is sufficient video memory available. If so, the resource manager proceeds to allocate the resource (204) and builds a structure representing the hardware resource. For a surface, the resource manager can allocate surface memory by scanning the video memory heap to find available memory and the best fit given the dimensions of the requested surface. The resource manager then builds a data structure representing the resource. After creating this structure, the resource manager returns an instance of an object representing the resource to the requesting application.

Figures 5, 6, 7:
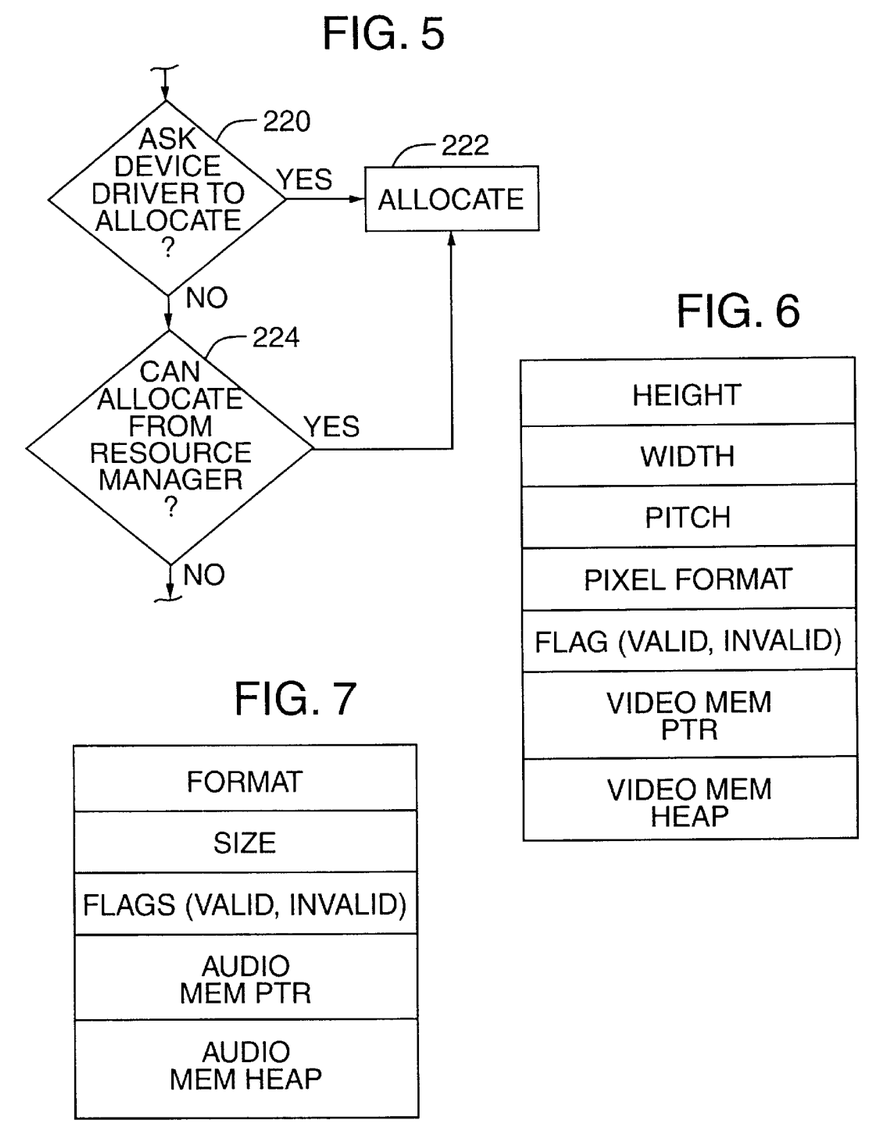
FIG. 5 is a flow diagram illustrating a flow diagram illustrating one aspect of the FIG. 5 is a flow diagram illustrating one aspect of the method in FIG. 4 in more detail.
FIG. 6 is a diagram illustrating an example of a structure for storing resource specific data for a surface.
FIG. 7 is a diagram illustrating an example of a structure for storing resource specific data for a sound buffer.

FIG. 6 illustrates an example of a data structure used to store resource specific data for a surface. As shown, this data structure includes the height and width, the pitch, and the pixel format of the surface. The structure also includes a flag or flags, one of which is used to indicate whether the structure is valid or invalid. This particular flag is used to indicate whether the resource has been freed. The structure also includes a pointer to the specific memory region where the surface resides and the memory heap that memory came from.

FIG. 6 illustrates only one possible implementation of the structure. Many other variations are possible. For example, if several duplicate instances of a surface object are created to refer to the same resource, the data structure can be implemented using a pairs of structures, with one storing instance specific data such as a color key for an overlay and another representing the resource specific data such as its dimensions and location of the pixels in memory FIG. 7 illustrates an example of structure representing a sound buffer. The data structure can include such things as the format of the data such as the sample rate and bit size of the samples, the size of the buffer. Like the media resource structure in FIG. 6, this structure includes a flag indicating whether the structure is valid, i.e., whether the resource has been freed or not. Finally, the structure includes a pointer to the location in audio memory where the resource resides and a reference to the memory heap where the audio memory came from.

If the hardware resource is not available, the resource manager checks to determine whether it should try to allocate the resource using the resources of the host PC (208). The application can specify whether or not the resource manager can use the host PC. For example, if the application does not specify that a surface should reside in video memory, the resource manager will try to create the surface using main memory. A resource may not be able to be allocated in software because the feature is not supported in software. If the application specifies or the resource manager determines that using the host PC is not an available option, the request for the resource fails at this point. Otherwise, the resource manager allocates an emulation resource 210 (a software emulator of an overlay, a software emulator of a secondary sound buffer, etc.). The resource manager then builds the data structure representing the resource and returns an instance of the object to the requesting application.

The manner in which the resource manager allocates resources can be implemented in a variety of ways. FIG. 5 illustrates one possible example where the API will defer to the device driver to allocate a particular resource first (220, 222) and then use its own resource allocation services if the driver does not provide them (224). For example, a device driver for a video card can provide video memory management for the video memory on the card. If the device driver does not provide resource allocation services, the API provides them in this implementation. This is shown in FIG. 5 where the API defers to the resource allocation service of the device driver, but can provide resource allocation if not provided in the device driver.

Figure 8:
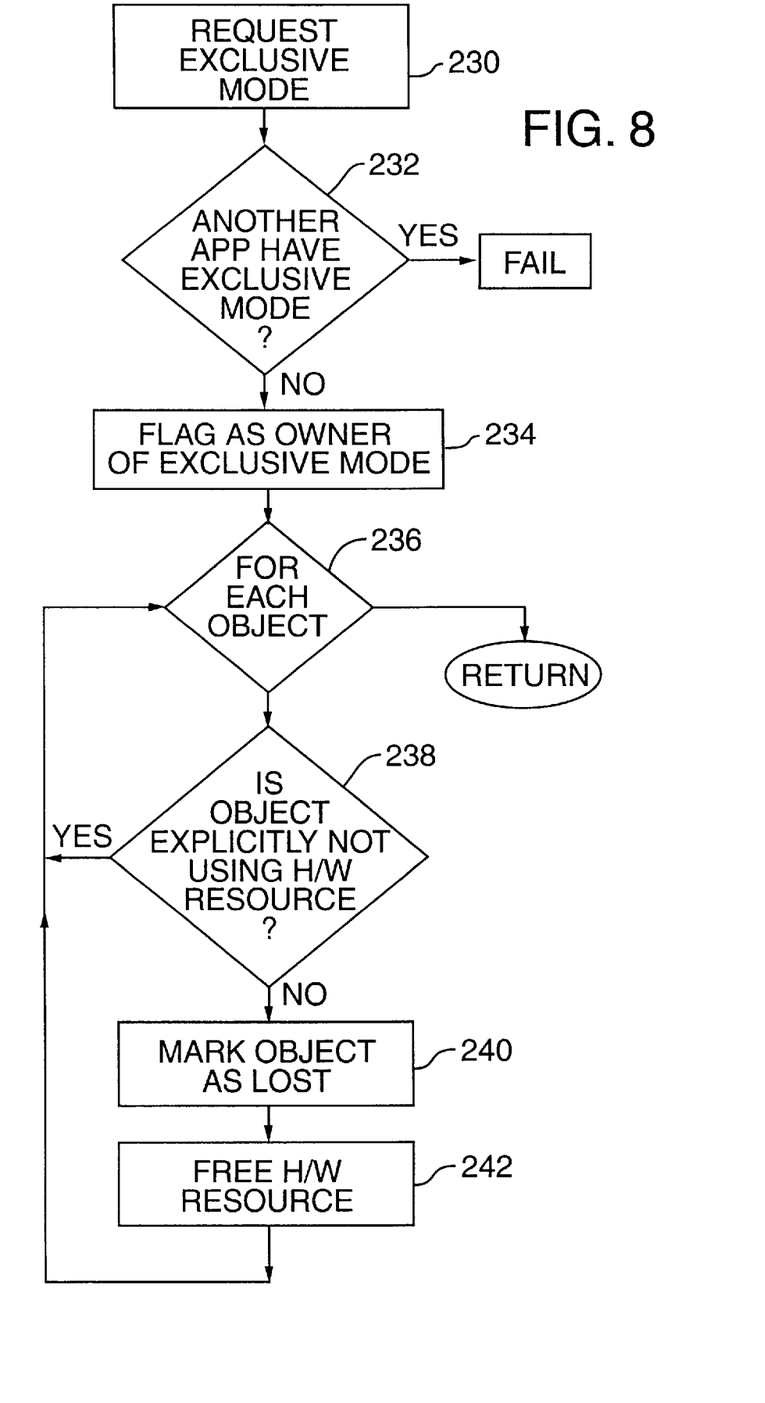
FIG. 8 is a flow diagram illustrating a method for requesting exclusive access to a multimedia resource in an embodiment.

FIG. 8 is a flow diagram illustrating how the resource manager responds when an application requests exclusive access (exclusive mode) (230) to a media device. The resource manager first checks whether another application already has exclusive mode (232). If so, the request for exclusive mode fails. If not, the application gets exclusive mode and all available resources of the media device are freed for its use. In this implementation, an application with exclusive mode is marked as such with a flag indicating that it is the current owner of exclusive mode (234).

The process of freeing up the resources in the media device involves looping through each object allocated for the media device. In this implementation, resources explicitly created to use software are not freed (238). These are media objects that the application asked the API to create using software resources explicitly. Resources are freed by marking all objects, except the ones explicitly using software resources, as freed or "lost" (240). As shown in FIGS. 6 and 7, a flag is set in the data structure representing the resource indicating that the resource has been freed. The resource manager then frees the hardware resource. For example, in the case of surface or sound buffer, the video or audio memory manager frees the specific memory allocated to the resource.

Figure 9:
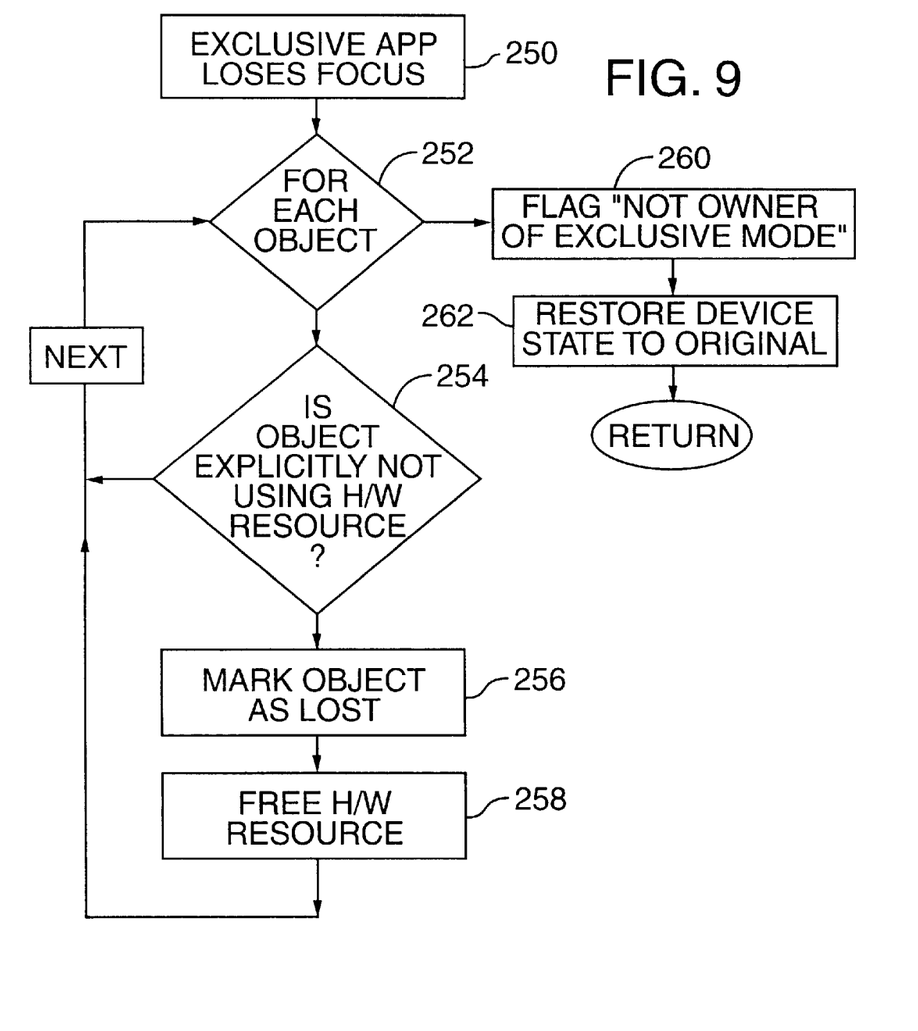
FIG. 9 is a flow diagram illustrating a method executed when an application having exclusive ownership of a media device loses focus in an embodiment.

FIG. 9 is a flow diagram illustrating how the resources are freed when an application having exclusive ownership of a media device loses focus (250). In one implementation for the Windows® 95 operating system, the API knows when an application loses or regains focus by hooking the application's main window and watching for user input messages. In addition, the API disables the hot key handler in the operating system and emulates its functionality while an application has exclusive ownership of the media device. Thus, the API knows when the user presses the hot keys (Alt-tab, for example) to change the focus. When an application in exclusive mode loses focus, the resource manager frees each of the media objects currently allocated for the media device. The process of freeing the resources is the same as for steps 238–242 in FIG. 8. Resources explicitly created using the host PC's resources (e.g. emulated in software) The resource manager loops on each object (252) and marks its corresponding structure as lost (256). The specific resource is then freed for use by another application (258).

After the objects are freed, a flag is set for the application indicating that it is not the owner of exclusive mode (260). Next, the API automatically restores the state of the media device to the state it was in before the exclusive mode application gained the focus (262). The API maintains the state of the media hardware for the current application and operating system user's preference for the state of the media hardware and uses this information to restore hardware state information for changes in focus.

Figure 10:
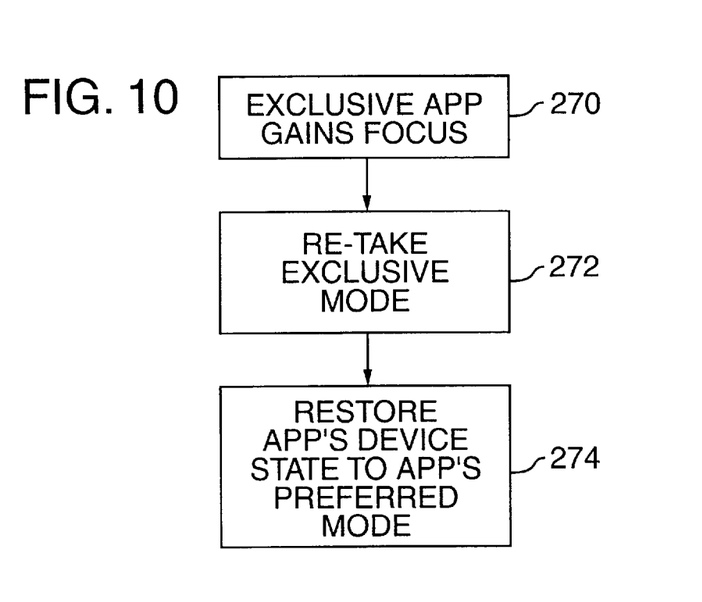
FIG. 10 is a flow diagram illustrating a method executed when an application requesting exclusive ownership of a media device gets the focus.

FIG. 10 is a flow diagram illustrating how an application requesting exclusive mode regains exclusive control of a media device when it gains focus (270). When the application regains focus, it reclaims exclusive control of the media resource. Block 272 of FIG. 10 generally represents the process of freeing up the hardware resources for the application that is getting exclusive control of the media device resources. This process is the same as steps 236–242 in FIG. 8, and thus is not repeated here. In addition to freeing up the resources of the media device, the resource manager restores the hardware state to the application's preferred mode (274). The API saves the mode or hardware state information for the application and uses this information to automatically restore the hardware state when the application regains focus.

Figure 11:
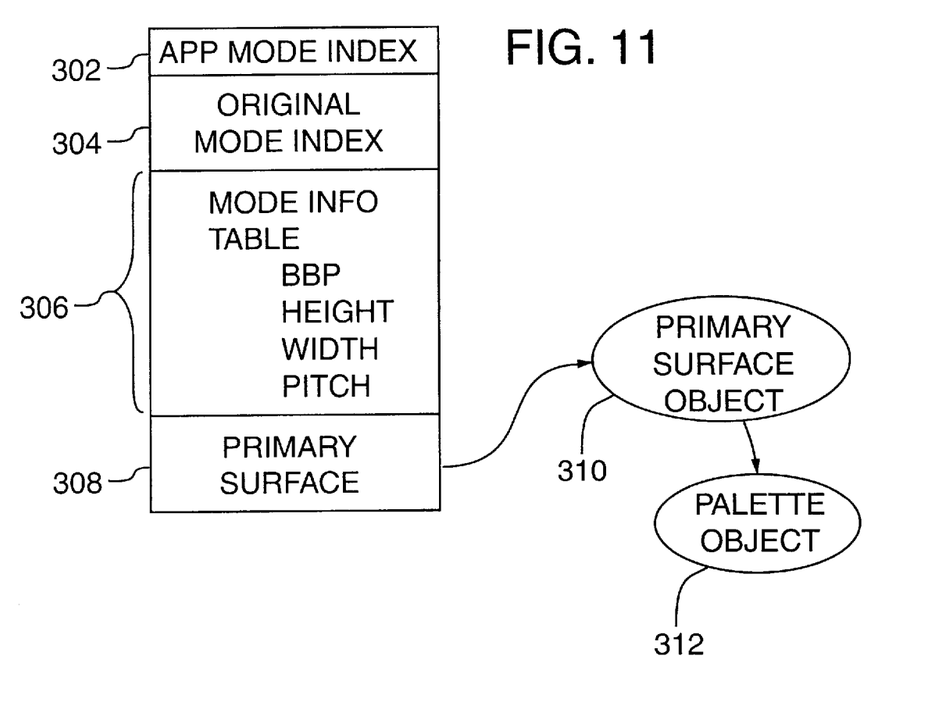
FIG. 11 is a diagram illustrating a data structure used to maintain state information about a display device.

FIG. 11 is a diagram illustrating an example of a data structure 300 used to store hardware state information for a display device. The structure shown here records state information by keeping mode indexes 302, 304 into a mode table 306. The mode table includes information for different modes supported in the display device. Mode information for a display device includes such things as pixel format, height and width of the display, pitch, etc. The structure has a field 302 for a mode index of the application that currently has exclusive control as well as a field 304 for the original mode, which is the mode of the device when the application gained exclusive control.

The API also maintains state information to restore the primary surface. This is shown in the data structure in FIG. 11, which includes a pointer 308 to the surface object 310 representing the primary surface. If the primary surface is being restored to a palletized mode, the API restores the color table of the display device by setting its entries to the entries for the palette object (312) attached to the primary surface object.

The sound API automatically restores hardware state information in a similar fashion. Specifically, the API retains state information for the sound device and the primary buffer. When the focus changes, the sound API restores the primary buffer and its format.

To regain control of a resource, applications can attempt to restore the resources by invoking the restore member function of the object that they are trying to restore. While the API automatically restores hardware state information and restores resources such as the primary surface or primary buffer, the application can explicitly restore other media resources by invoking the restore services provided in the API. This feature is described above in connection with specific types of objects including surface objects, palette objects, and sound buffer objects, for example. Below, we describe an implementation in more detail.

Figure 12:
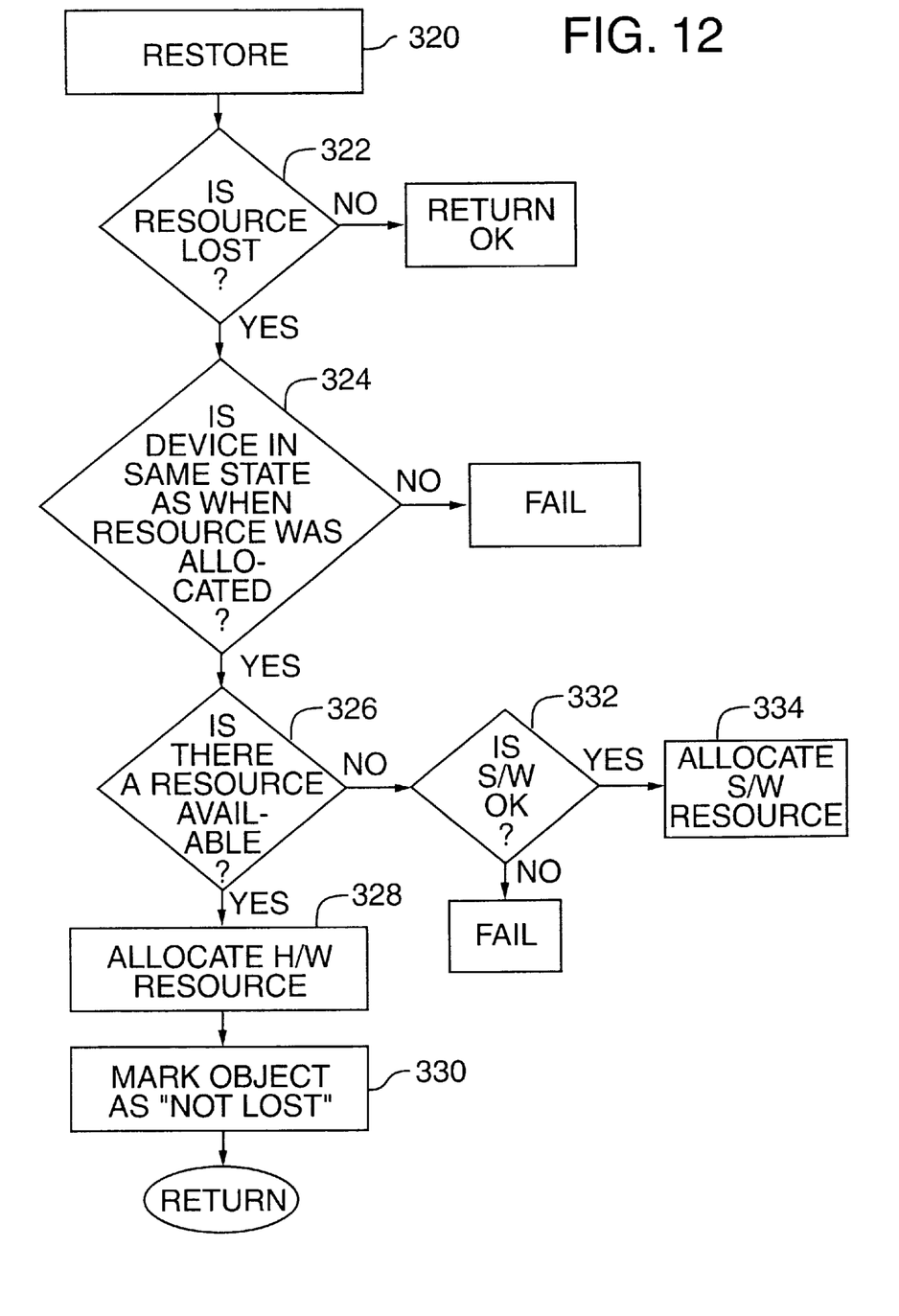
FIG. 12 is a flow diagram illustrating a method for restoring resources in an embodiment.

FIG. 12 is a flow diagram illustrating a method for restoring objects representing device resources. In response to a restore request for a specified object 320, the restore function first determines whether the specific resource has been lost (freed) (322). To accomplish this, it checks the data structure representing the resource, which includes a flag indicating whether the resource is valid or not as explained above. If the resource has not been freed, the function returns OK, which indicates that the resource is allocated.

Next, the restore function determines whether the device state is the same as when the resource was allocated (324). When an object is created, the state of the device that owns it is saved. This state information is associated with the data structure representing the object. Thus, when an application wishes to restore the object, the restore function can compare the preferred state of the object with the current state of the media device. If the state is not the same, the restore function fails. Otherwise, it proceeds to try to re-allocate the resources for the object.

The process for allocating resources proceeds as described for FIG. 4. Specifically, the restore function determines whether hardware resources are available (326). If so, resources are allocated for the resource and the data structure representing the object is marked as valid or "not lost" (328, 330).

If hardware resources are not available, the restore function checks whether the resources can be allocated using the host PC (332). The application may specify that the resource must be allocated using the media device's resources. In addition, the API may not be able to emulate the feature. In either case, the restore function cannot use the host PC to allocate the resource and the function fails. If the application specifies that software resources can be used and the software emulation is available, the restore function allocates the resource using the host PC (334).

While we have described our invention with reference to specific implementations, we do not intend to limit our invention to these implementations. The resource management functions can be implemented in a variety of ways using any of a number of programming approaches.

Having described and illustrated the principles of our invention with reference to a preferred embodiment and several alternative embodiments, it should be apparent that the invention can be modified in arrangement and detail without departing from its principles. Accordingly, we claim all modifications as may come within the scope and spirit of the following claims.

What is claimed is:

1. A method for managing resources of a media device in a multitasking computer where at least two application programs are contending for the resources of the media device and where one of the application programs has a current input focus, the method comprising:

freeing up all available resources of the media device for use by a first application in exclusive mode such that the first application has exclusive use of the available resources;

while the first application has the current input focus and is in the exclusive mode, preventing another application program from accessing the available resources;

storing a preferred state of the media device for the first application;

determining when the current input focus changes from the first application to a second application by monitoring user input to detect when user input is directed to user interfaces of the first and second applications;

in response to detecting that the first application has lost the input focus and a second application in exclusive mode gains the current input focus from the monitoring of user input, freeing up all available resources of the media device for use by the second application such that the second application has exclusive use of the available resources; and in response to detecting that the first application has regained the current input focus from the monitoring of user input, freeing up all resources of the media device for use by the first application such that the first application has exclusive use of the available resources, and restoring the preferred state of the media device for the first application.

2. The method of claim 1 further including:

creating data structures representing resources of the media device that the first application has requested and obtained while in exclusive mode; and when the first application loses the input focus, marking the data structures as freed, maintaining the data structures, and freeing the media device resources corresponding to the data structures.

3. The method of claim 2 further comprising:

in response to a request from the first application to restore a first resource, re-allocating the first resource and marking the data structure corresponding to the first resource to indicate that the first resource has been re-allocated.

4. The method of claim 1 wherein the media device is a display controller and the resources include regions of surface memory in video memory on the display controller.

5. The method of claim 4 wherein the preferred state of the media device includes the pixel format, the display height and width, and the display pitch.

6. The method of claim 4 including:
automatically restoring a primary surface associated with the first application when the first application regains the current input focus.

7. The method of claim 6 wherein the resources include a color table of the display controller, and further including:
automatically restoring the primary surface and color table entries associated with the first application when the first application regains the current input focus.

8. The method of claim 1 wherein the media device is a display controller and further including:
a) in response to a request to allocate surface memory from the first application, allocating a region in surface memory on the display controller and creating a data structure representing the surface memory, wherein the data structure includes a reference to the region in surface memory and attributes of a surface stored in the region of surface memory;
b) repeating step a) in response to subsequent requests from the first application; and
c) when the first application loses the current input focus, marking the data structures corresponding to the regions in surface memory as freed, maintaining the data structures after the first application loses the current input focus, and freeing the regions in surface memory corresponding to the data structures; and
d) in response to a request to restore a surface represented by a corresponding data structure, re-allocating a region in surface memory, storing a reference to the re-allocated region in the corresponding data structure, and marking the corresponding data structure to indicate that the resource has been re-allocated.

9. The method of claim 1 wherein the media device is a sound device and the resources comprise sound buffers on the sound device.

10. The method of claim 9 wherein the preferred state of the sound device includes a sound format associated with the first application.

11. The method of claim 9 including:
automatically restoring a primary sound buffer associated with the first application when the first application regains the current input focus.

12. The method of claim 9 further including:
a) in response to a request to allocate a sound buffer from the first application, allocating a region in memory on the sound device and creating a data structure representing the sound buffer, wherein the data structure includes a reference to the region in memory and attributes of a sound wave or waves stored in the region of memory;
b) repeating step a) in response to subsequent requests from the first application; and
c) when the first application loses the current input focus, marking the data structures corresponding to the regions in memory as freed, maintaining the data structures after the first application loses the current input focus, and freeing the regions in memory corresponding to the data structures; and
d) in response to a request to restore a sound buffer represented by a corresponding data structure, re-allocating a region in memory, storing a reference to the re-allocated memory region in the corresponding data structure, and marking the corresponding data structure to indicate that the resource has been re-allocated.

13. In an application programming interface for a media device selected from the group consisting of a display controller, sound device, 3D accelerator, or integrated media device, a method for managing resources of the media device in a multitasking computer where at least two application programs are contending for the resources of the media device and where only one of the application programs has a current input focus at any time, the method comprising:
in response to a request from a first application to enter exclusive mode, freeing up all available resources of the media device for use by a first application in exclusive mode such that the first application has exclusive use of the available resources;
while the first application has the current input focus and is in the exclusive mode, preventing another application program from accessing the available resources;
storing a preferred state of the media device for the first application;
determining when the current input focus changes from the first application to a second application by monitoring user input from the operating system to detect when user input is directed to user interfaces of the first and second applications;
in response to detecting that the first application has lost the input focus and a second application in exclusive mode gains the current input focus from the monitoring of user input, freeing up all available resources of the media device for use by the second application such that the second application has exclusive use of the available resources; and
in response to detecting that the first application has regained the current input focus from the monitoring of user input, freeing up all resources of the media device for use by the first application such that the first application has exclusive use of the available resources, and restoring the preferred state of the media device for the first application.

14. A computer readable medium on which is stored an application programming interface (API) for managing resources of a media device in a computer, said API comprising instructions, which when executed by the computer, perform the steps of:
freeing up all available resources of the media device for use by a first application in exclusive mode such that the first application has exclusive use of the available resources;
while the first application has a current input focus and is in the exclusive mode, preventing another application program from accessing the available resources;
storing a preferred state of the media device for the first application;
determining when the current input focus changes from the first application to a second application by monitoring user input to detect when user input is directed to user interfaces of the first and second applications;

in response to detecting that the first application has lost the input focus and a second application in exclusive mode gains the current input focus from the monitoring of user input, freeing up all available resources of the media device for use by the second application such that the second application has exclusive use of the available resources; and in response to detecting that the first application has regained the current input focus from the monitoring of user input, freeing up all resources of the media device for use by the first application such that the first application has exclusive use of the available resources, and restoring the preferred state of the media device for the first application.

15. A method for managing resources of a media device in a multitasking computer where at least two application programs are contending for the resources of the media device and where one of the application programs has a current input focus, the method comprising:

freeing up all available resources of the media device for use by a first application in exclusive mode such that the first application has exclusive use of the available resources;

while the first application has the current input focus and is in the exclusive mode, preventing another application program from accessing the available resources;

storing a preferred state of the media device for the first application;

determining when the current input focus changes from the first application to a second application by monitoring user input to detect when user input is directed to user interfaces of the first and second applications;

in response to detecting that the first application has lost the input focus and a second application gains the current input focus from the monitoring of user input, freeing up available resources of the media device; and in response to detecting that the first application has regained the current input focus from the monitoring of user input, freeing up all resources of the media device for use by the first application such that the first application has exclusive use of the available resources, and restoring the preferred state of the media device for the first application.

16. A computer readable medium having instructions for performing the steps of claim 15.

* * * * *